US008530050B2

(12) United States Patent
Ross et al.

(10) Patent No.: US 8,530,050 B2
(45) Date of Patent: Sep. 10, 2013

(54) WEAR RESISTANT COATING

(75) Inventors: Eli N. Ross, Vernon, CT (US); Paul H. Zajchowski, Enfield, CT (US)

(73) Assignee: United Technologies Corporation, Hartford, CT (US)

( * ) Notice: Subject to any disclaimer, the term of this patent is extended or adjusted under 35 U.S.C. 154(b) by 1256 days.

(21) Appl. No.: 11/805,160

(22) Filed: May 22, 2007

(65) Prior Publication Data

US 2008/0292897 A1 Nov. 27, 2008

(51) Int. Cl.
*B32B 9/00* (2006.01)

(52) U.S. Cl.
USPC .......................................................... 428/408

(58) Field of Classification Search
USPC .......................................................... 428/408
See application file for complete search history.

(56) References Cited

U.S. PATENT DOCUMENTS 2,714,563 A 8/1955 Poorman et al.
3,901,689 A 8/1975 Pelton
3,954,479 A 5/1976 Jahn
4,275,124 A 6/1981 McComas et al.
4,477,088 A 10/1984 Picard
4,728,448 A 3/1988 Sliney
4,851,093 A 7/1989 Routsis
4,865,252 A 9/1989 Rotolico et al.
4,868,069 A 9/1989 Darrow
4,883,639 A 11/1989 Adlerborn et al.
4,948,425 A 8/1990 Watanabe et al.
4,984,069 A 1/1991 Yamada et al.
5,120,582 A 6/1992 Browning
5,122,182 A 6/1992 Dorfman et al.
5,137,422 A 8/1992 Price et al.
5,148,986 A 9/1992 Rusch
5,419,976 A 5/1995 Dulin
5,536,022 A 7/1996 Sileo et al.
5,652,028 A 7/1997 Taylor et al.
5,709,936 A 1/1998 Besmann et al.
5,763,106 A 6/1998 Blanchard et al.
5,780,116 A 7/1998 Sileo et al.
5,939,146 A 8/1999 Lavernia
6,042,019 A 3/2000 Rusch
6,071,324 A * 6/2000 Laul et al. ........................ 75/252

(Continued)

FOREIGN PATENT DOCUMENTS

CN 1443868 9/2003
DE 19700835 A1 7/1997

(Continued)

OTHER PUBLICATIONS

S. Zhang, et al., "Magnetron sputtering of nanocomposite (Ti, Cr) CN/DLC Coatings", from Surface and Coatings Technology 162, 2002, pp. 42-48.

(Continued)

*Primary Examiner* — Maria Veronica Ewald
*Assistant Examiner* — Daniel H Miller
(74) *Attorney, Agent, or Firm* — Kinney & Lange, P.A.

(57) ABSTRACT

A wear-resistant component of a carbon seal includes a surface and a coating applied onto the surface. The coating is a chromium carbide-nickel chromium composition constituting between about 75% and about 85% by weight chromium carbide and between about 15% and about 25% by weight nickel chromium. The chromium carbide-nickel chromium composition is applied onto the surface by high velocity oxy-fuel spraying (HVOF).

12 Claims, 1 Drawing Sheet

(56) References Cited

U.S. PATENT DOCUMENTS

| | | | |
|---|---|---|---|
| 6,186,508 | B1 | 2/2001 | Zajchowski et al. |
| 6,607,782 | B1 | 8/2003 | Malshe et al. |
| 6,813,980 | B2 | 11/2004 | Inayama |
| 6,929,851 | B1 | 8/2005 | Leverenz et al. |
| 2001/0001042 | A1 | 5/2001 | Sinatra et al. |
| 2002/0029909 | A1 | 3/2002 | Griffo et al. |
| 2004/0142196 | A1 | 7/2004 | Hajmrle et al. |
| 2007/0099027 | A1 | 5/2007 | Krishnamurthy et al. |
| 2007/0148478 | A1 | 6/2007 | Schmitz et al. |
| 2007/0216107 | A1 | 9/2007 | Freling |
| 2007/0259194 | A1 | 11/2007 | Freling |

FOREIGN PATENT DOCUMENTS

| | | | |
|---|---|---|---|
| EP | 0292250 | | 11/1988 |
| EP | 323185 | | 7/1989 |
| EP | 0408535 | A | 1/1991 |
| EP | 0 522 583 | | 7/1992 |
| EP | 0594875 | A | 5/1994 |
| EP | 0641869 | A1 | 3/1995 |
| EP | 0685572 | | 12/1995 |
| EP | 0845543 | A1 | 6/1998 |
| EP | 0961017 | A2 | 12/1999 |
| GB | 886560 | | 1/1962 |
| JP | 55120936 | | 9/1980 |
| JP | 59029819 | | 2/1984 |
| JP | 63195268 | A | 8/1988 |
| JP | 2217359 | | 8/1990 |
| JP | 06108254 | A | 4/1994 |
| JP | 8117984 | | 5/1996 |
| JP | 2001107221 | | 4/2001 |

OTHER PUBLICATIONS

I.A. Podchernyaeva, et al., "Wear and Scaling Resistant Coatings Based on TiCN," from Powder Metallurgy and Metal Ceramics, vol. 40, Nos. 5-6, 2001 pp. 247-257.

P. Schwarzkopf, R. Kieffer, Refractory Hard Metals, pp. 377, 394, 395, 398, and 401 (The MacMillan Company, New York, 1953).

B. Q. Wang et al., "The erosion-oxidation behavior of HVOF Cr3C2-NiCr cermet coating", from Wear, 174 (1994) pp. 177-185.

L. M. Berger et al., "Structure, Properties and Potentials of WC-CO, Cr3C2-NiCr and TiC-Ni-Based Hardmetal-like Coatings", from Thermal Spray: Practical Solutions for Engineering Problems, (1996) pp. 89-96.

S. Matthews, et al., "Microhardness variation in relation to carbide development in heat treated Cr3C2-NiCr thermal spray coatings", from Acta Materialia 51 (2003) pp. 4267-4277.

J. M. Guilemany et al., "High-Velocity Oxyfuel Cr3C2-NiCr Replacing Hard Chromium Coatings", from Journal of Thermal Spray Technology, vol. 14(3) (Sep. 2005) pp. 335-341.

G.C. Ji et al., "Microstructural characterization and abrasive wear performance of HVOF sprayed Cr3-C2-NiCr coating", from Surface Coatings Technology 200 (2006) pp. 6749-6757.

T.S. Sidhu et al., "Characterizations and Hot Corrosion Resistance of Cr3C2-NiCr Coating on No-Base Superalloys in an Aggressive Environment", from Journal of Thermal Spray Technology, vol. 15(4) (Dec. 2006) pp. 811-816.

S. Bose, "Oxidation and Corrosion-Resistant Coatings", from High Temperature Coatings (2007) pp. 103-105.

* cited by examiner

WEAR RESISTANT COATING

The U.S. Government may have certain rights in this invention pursuant to Contract Number F33657-99-D-2051 with the United States Air Force.

BACKGROUND

The present invention generally relates to the field of wear resistant coatings. In particular, the present invention relates to wear resistant coatings for carbon seals.

Successful operation and performance of gas turbine engine bearing compartment carbon seals is strongly dependent on having a hard, chemically stable, and thermal-shock resistant counterface material system. The most common arrangement involves a static carbon seal, spring and air loaded axially against a shaft co-rotating ring, known as a seal plate or seal seat. The counterface is defined as the region of the seal seat contacting the axial and/or radial face of the carbon seal.

Historically, the counterface material system has consisted of a low alloy steel protected with hard chromium plating (HCP) or by a chromium carbide-nickel chromium coating applied by a Detonation Gun (D-Gun), available from Praxair Surface Technologies, Inc. Seal applications using HCP are typically limited to lower speed applications, and the plating process generates a heavily regulated hexavalent-chromium waste stream. While a superior counterface to hard chromium plating, the chromium carbide-nickel chromium coating applied by the D-Gun can exhibit localized surface distress in the form of radial or craze-type cracks due to thermal-mechanical stresses during operation. The cracks occasionally propagate to the extent that the coating material is liberated from the coated surface, either as discrete pull-out or gross spallation.

Attempts have been made to either complement or improve upon the D-Gun technology by depositing coatings using the continuous combustion high velocity oxygen fuel (HVOF) method. These attempts have been generally unsuccessful for application to a seal seat coating running against gas turbine engine carbon seals. Potential reasons include: the coatings were developed for other types of wear applications involving different mating materials and operating environments; carbide type and chemistry not thermo-chemically stable for operation against carbon seals at high power; and microstructures, primarily phase morphology and size, were not optimized to resist the propagation of surface thermal cracks into the thickness of the coating, often resulting in a rapid and catastrophic breakdown of the coating and unacceptable levels of carbon seal wear. It would be beneficial to develop a coating applied by HVOF for use with carbon seals.

SUMMARY

A wear-resistant component of a carbon seal includes a surface and a coating applied onto the surface. The coating is a chromium carbide-nickel chromium composition constituting between about 75% and about 85% by weight chromium carbide and between about 15% and about 25% by weight nickel chromium. The chromium carbide-nickel chromium composition is applied onto the surface by high velocity oxygen fuel spraying (HVOF).

DETAILED DESCRIPTION

Figure 1:
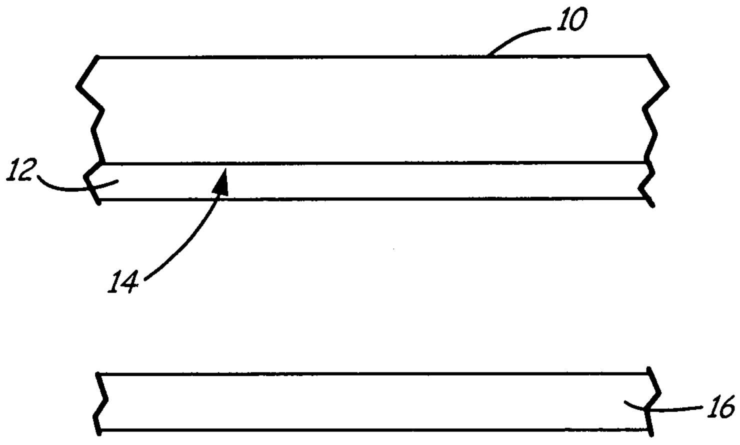
FIG. 1 is a schematic view of a wear-resistant coating of a carbon seal interface.

FIG. 1 shows an exemplary embodiment of counterface 10 having wear-resistant coating 12 applied onto surface 14 of counterface 10. Counterface 10 is used in conjunction with mating surface 16 in a seal system, such as a carbon seal system. Coating 12 functions to protect surface 14 of counterface 10 against the harsh environments of a gas turbine engine and against wear when counterface 10 contacts mating surface 16. Coating 12 exhibits desirable phase distribution, morphology, oxide level, porosity, micro-hardness, and other characteristics for enhanced resistance to the propagation of surface thermal cracks in coating 12 during seal operation. In addition, use of coating 12 on counterface 10 reduces thermally-induced cracking or spallation, reduces wear in mating surface 16, improves limits in build-up of coating 12, and increases repair applicability. Although coating 12 is discussed as being used in carbon seal applications, coating 12 may be used in any application where wear-resistance is desirable.

Coating 12 is applied onto surface 14 of rotating counterface 10. Surface 14 faces stationary mating surface 16. Coating 12 may be applied onto surface 14 as a dense single phase layer or as a composite. Coating 12 is formed of a chromium carbide-nickel chromium composition and may be either a blended powder or an alloyed powder. In an exemplary embodiment, coating 12 constitutes between approximately 75% and approximately 85% by weight chromium carbide and between approximately 15% and approximately 25% by weight nickel chromium. The composition preferably constitutes approximately 80% by weight chromium carbide and approximately 20% by weight nickel chromium. In an exemplary embodiment, the particle size of the chromium carbide and the nickel chromium is between approximately 16 microns and approximately 45 microns. The particle size of the chromium carbide and the nickel chromium is preferably approximately 30 microns.

Mating surface 16 is typically formed of a carbon source, such as amorphous carbon or crystalline graphite. In an exemplary embodiment, mating surface 16 is a stationary, solid graphite ring.

Prior to applying coating 12 onto counterface 10, counterface 10 is cleaned and the areas of counterface 10 that are not to be coated are masked. Surface 14 of counterface 10 is then grit-blasted to provide a roughened surface for improved coating adhesion. Coating 12 is applied onto surface 14 of counterface 10 as a clad or alloyed powder by high velocity oxy-fuel (HVOF) thermal spray process. In the HVOF thermal spray process, a high velocity gas stream is formed by continuously combusting oxygen and a gaseous or liquid fuel. A powdered form of the coating to be deposited is injected into the high velocity gas stream and the coating is heated proximate its melting point, accelerated, and directed at the substrate to be coated. The HVOF process imparts substantially more kinetic energy to the powder being deposited than many existing thermal spray coating processes. As a result, an HVOF applied coating exhibits considerably less residual tensile stresses than other types of thermally sprayed coatings. Oftentimes, the residual stresses in the coating are compressive rather than tensile. These compressive stresses also contribute to the increased coating density and higher coating thickness capability of this process compared to other coating application methods.

The particular HVOF thermal spray parameters will vary depending on numerous factors, including, but not limited to: the type of spray gun or system used, the type and size of powder employed, the fuel gas type, and the configuration of counterface 10. In an exemplary embodiment, coating 12 is sprayed onto surface 14 using a Sulzer Metco Diamond Jet Hybrid HVOF spray system with hydrogen as the fuel gas and a standard nozzle designed for hydrogen-oxygen combustion. Although hydrogen is described as the fuel gas used, kerosene or propylene may also be used as the fuel gas in other HVOF systems. In other alternate embodiments, the parameters may be modified for use with other HVOF systems and techniques using other fuels. A cooling gas, or shroud gas, may also used to in the HVOF process to help maintain the temperature of the process. In an exemplary embodiment, the flow rate of hydrogen fuel gas is between approximately 661 liters per minute (1400 cubic feet per hour at standard conditions (scfh)) and approximately 755 liters per minute (1600 scfh) and the flow rate of oxygen fuel gas is between approximately 189 liters per minute (400 scfh) and approximately 283 liters per minute (600 scfh). In an exemplary embodiment, the cooling/shroud gas is air and has a flow rate of between approximately 283 liters per minute (600 scfh) and approximately 425 liters per minute (900 scfh). Standard conditions are defined as approximately 25 degrees Celsius and approximately 1 atmosphere of pressure.

The composition of coating 12 in powder form is fed into the spray gun at a rate of between approximately 45 grams per minute and approximately 90 grams per minute. A nitrogen carrier gas in the spray gun has a flow rate of between approximately 11.8 liters per minute (25 scfh) and approximately 16.5 liters per minute (35 scfh) to provide adequate particle injection of the powder or powder alloy into the plume centerline of the HVOF system. The powder composition of coating 12 that is fed into the spray gun is heated to a temperature of between approximately 1371 degrees Celsius (2500 degrees Fahrenheit) and approximately 2204 degrees Celsius (4000 degrees Fahrenheit) and at a velocity of between approximately 305 meters per second (1000 feet per second) and approximately 915 meters per second (3000 feet per second) in the HVOF jet.

During spray deposition of coating 12, counterface 10 is rotated to produce surface speeds of between approximately 61 meters per minute (200 surface feet per minute (sfpm)) and approximately 122 meters per minute (400 sfpm). The spray gun is typically located at an outer diameter of counterface 10 and traverses in a horizontal plane across surface 14 of counterface 10 at a speed of between approximately 20.3 centimeters per minute (8 inches per minute) and approximately 101.6 centimeters per minute (40 inches per minute) and at an angle of between approximately 45 degrees and approximately 90 degrees from surface 14. In an exemplary embodiment, the spray gun is oriented at approximately 90 degrees from surface 14. While spraying coating 12 onto surface 14, the spray gun is positioned between approximately 23 centimeters (9 inches) and approximately 30.5 centimeters (12 inches) from surface 14 of counterface 10. Generally, the temperature of counterface 10 when coating 12 is being sprayed onto surface 14 is affected by factors including, but not limited to: the rotation speed of counterface 10, the surface speed, the gun traverse rate, and the size of counterface 10. To help control the temperature of counterface 10, external gas may be utilized to cool counterface 10.

Upon impact with surface 10, the composition solidifies, shrinks, and flattens against surface 10 to form coating 12. Depositing the composition in this manner allows a repeatable coating 12 with an optimized lamellar microstructure. In an exemplary embodiment, coating 12 has a predominantly lamellar splat structure with isolated regions of cubodial carbide phases such that coating 12 is a discrete mixture of (1) cubodial Cr3C2 carbides; (2) precipitated matrix carbides, predominately lamellar, of the form CrxCy, where x=7 to 23 and y=3 to 6; (3) fine lamellar nickel oxides; and (4) a fine lamellar Ni—Cr binder. Coating 12 has a maximum porosity of approximately 3%, a nominal oxide level of between approximately 10% and approximately 20%, and a microhardness of between approximately 850 Vickers Hardness (HV) and approximately 1150 HV. In an exemplary embodiment, coating 12 is applied onto surface 10 to a thickness of between approximately 203 microns (0.008 inches) and approximately 762 microns (0.03 inches). Preferably, coating 12 is applied onto surface 10 to a thickness of between approximately 254 microns (0.01 inches) and approximately 508 microns (0.02 inches). Coating 12 is then finished to a thickness of between approximately 76 microns (0.003 inches) and approximately 380 microns (0.015 inches).

Figure 2:
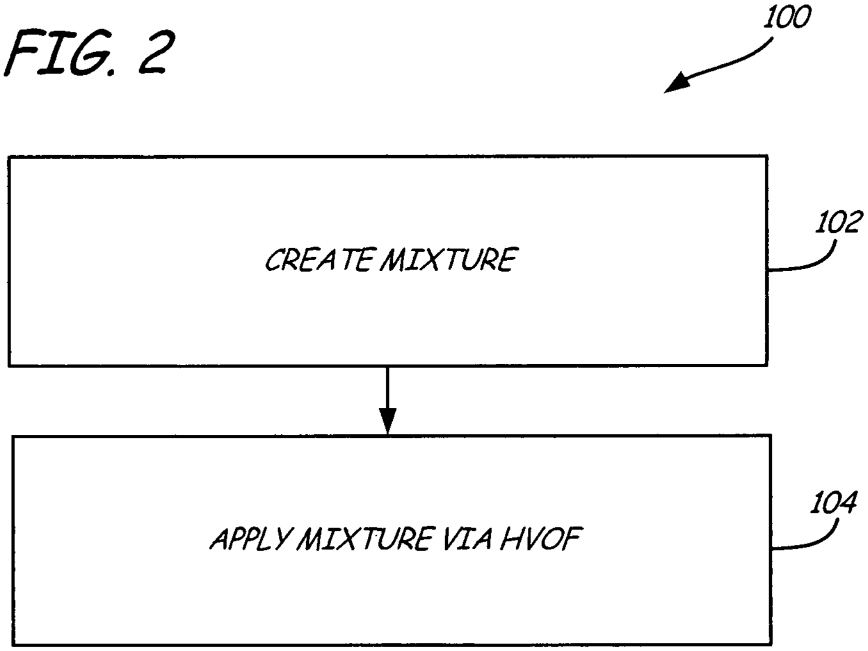
FIG. 2 is a diagram of a method of applying the wear-resistant coating onto a surface of a carbon seal counterface.

FIG. 2 is a diagram of a method of applying the wear-resistant coating onto a surface of a carbon seal counterface 100. In an exemplary embodiment, the powder may be a mechanical blend of between approximately 75% and approximately 85% by weight chromium carbide and approximately 15% and approximately 25% by weight nickel chromium to form a chromium carbide-nickel chromium mixture, Box 102. In an exemplary embodiment, the chromium carbide particles and the nickel chromium particles have an average particle size of approximately 30 microns. The chromium carbide-nickel chromium blended mixture is then injected into the HVOF gun and heated to between approximately 1371 degrees Celsius and approximately 2204 degrees Celsius. As shown in Box 104, while the chromium carbide-nickel chromium blended mixture is being heated, it is simultaneously accelerated at a velocity of between 305 meters per second and approximately 915 meters per second in the HVOF jet. Upon impact with surface 10, the chromium carbide-nickel chromium mixture solidifies, shrinks, and flattens to form coating 12. In an exemplary embodiment, the chromium carbide-nickel chromium mixture is fed into the spray gun at a rate of between 45 grams per minute and approximately 90 grams per minute. A nitrogen carrier gas in the spray gun has a flow rate of between approximately 11.8 liters per minute (25 scfh) and approximately 16.5 liters per minute (35 scfh). Oxygen has a flow rate of between approximately 189 liters per minute (400 scfh) and approximately 283 liters per minute (600 scfh), and hydrogen has a flow rate of between approximately 661 liters per minute (1400 scfh) and approximately 755 liters per minute (1600) scfh. The cooling gas is air and has a flow rate of between approximately 283 liters per minute (600 scfh) and approximately 425 liters per minute (900 scfh).

The wear-resistant coating of the present invention has many uses, such as being used in conjunction with carbon seals, rotating shaft journal surfaces, brush seal land surfaces, and other such similar surfaces as are typically found in gas turbine engines and other rotating turbo-machinery. In other embodiments, the present invention is, however, applicable to other surfaces subject to sliding, abrasive, erosive or fretting wear, particularly for surfaces operating continuously in environments above 900° F. (~482.2° C.). The coating is typically sprayed by high velocity oxygen fuel onto a counterface that is positioned adjacent a mating surface formed of a carbon source. The coating has a composition consisting essentially of chromium carbide and nickel chromium. Proper manipulation of the spray parameters results in the coating exhibiting particular phase distribution, morphology, oxide level, porosity, and micro-hardness. These properties enhance carbon seal or other wear system, performance by reducing thermally-induced cracking or spallation, reducing wear in mating surface, improving limits in coating build-up, and increasing repair applicability.

Although the present invention has been described with reference to preferred embodiments, workers skilled in the art will recognize that changes may be made in form and detail without departing from the spirit and scope of the invention.

The invention claimed is:

1. A wear-resistant component of a carbon seal, the component comprising:

a surface; and a coating applied onto the surface, wherein the coating is formed of a chromium carbide-nickel chromium composition constituting between about 75% and about 85% by weight chromium carbide and between about 15% and about 25% by weight nickel chromium, the coating also comprising a substantially and predominantly lamellar splat structure with a plurality of isolated regions of cuboidal carbide phases, wherein the cuboidal carbide phases consist essentially of a discrete mixture of cuboidal Cr3C2 carbides, substantially lamellar precipitated matrix carbides of the form CrxCy where x=7 to 23 and y=3 to 6, fine lamellar nickel oxides, and a fine lamellar Ni—Cr binder;

wherein the chromium carbide-nickel chromium coating has a maximum porosity of approximately 3%;

wherein the chromium carbide-nickel chromium coating has a nominal oxide level of between about 10% and about 20%;

wherein the chromium carbide-nickel chromium coating has a microhardness of between about 850 Vickers Hardness and about 1150 Vickers Hardness; and wherein the chromium carbide-nickel chromium composition is applied onto the surface by high velocity oxy-fuel spraying (HVOF).

2. The component of claim 1, wherein the chromium carbide-nickel chromium composition is applied in the form of a blended powder or an alloyed powder.

3. The component of claim 1, wherein the chromium carbide-nickel chromium composition constitutes about 80% by weight chromium carbide and about 20% by weight nickel chromium.

4. The component of claim 1, wherein the chromium carbide-nickel chromium coating is between about 203 microns and about 762 microns thick as sprayed.

5. The component of claim 1, wherein a chromium carbide-nickel chromium mixture is fed into an HVOF spray gun at a rate of between about 45 grams per minute and about 90 grams per minute.

6. The component of claim 1, wherein during application by HVOF, the composition is heated to a temperature of between about 1371 degrees Celsius and about 2204 degrees Celsius and accelerated at a velocity of between about 305 meters per second and about 915 meters per second in a high velocity oxygen fuel jet.

7. The wear-resistance component of a carbon seal of claim 1 wherein the surface of the wear-resistant component comprises a seal plate of a carbon seal.

8. A coating for providing increased wear resistance comprising:

from about 75% to about 85% by weight chromium carbide; and from about 15% to about 25% by weight nickel chromium;

wherein the coating has a substantially predominantly lamellar splat structure with a plurality of isolated regions of cuboidal carbide phases, wherein the cuboidal carbide phases consist essentially of a discrete mixture of cuboidal Cr3C2 carbides, substantially lamellar precipitated matrix carbides of the form CrxCy, where x=7 to 23 and y=3 to 6, fine lamellar nickel oxides, and a fine lamellar Ni—Cr binder;

wherein the coating has a porosity of up to about 3%;

wherein the coating has a nominal oxide level of between about 10% and about 20%; and wherein the coating has a microhardness of between about 850 Vickers Hardness and about 1150 Vickers Hardness.

9. The coating of claim 8, wherein alloyed chromium carbide and nickel chromium powder is applied by high velocity oxygen fuel spraying (HVOF) to form the coating.

10. The coating of claim 9, wherein the alloyed powder is applied to a thickness of between about 203 microns and about 762 microns as sprayed.

11. The coating of claim 9, wherein the chromium carbide and the nickel carbide powder have an average particle size of between about 16 microns and about 45 microns.

12. The coating of claim 8 wherein the seal is applied to a seal plate in a carbon seal.

* * * * *